S. W. HAYES.
CONNECTION ADJUSTMENT.
APPLICATION FILED MAY 9, 1910.

985,673.

Patented Feb. 28, 1911.

WITNESSES:
E. H. Agaha
Eugene Wood

Stanley W. Hayes
INVENTOR.
BY H. L. Kimball
ATTORNEY.

 UNITED STATES PATENT OFFICE.

STANLEY W. HAYES, OF GENEVA, NEW YORK.

CONNECTION ADJUSTMENT.

985,673.

Specification of Letters Patent. Patented Feb. 28, 1911.

Application filed May 9, 1910. Serial No. 560,358.

*To all whom it may concern:*

Be it known that I, STANLEY W. HAYES, a citizen of the United States, residing at Geneva, Ontario county, New York State, have invented certain new and useful Improvements in Connection Adjustments, of which the following, taken in conjunction with the accompanying drawings, forming a part hereof, is a full, true, and concise specification.

This invention is an adjustable connection device for the operating lines of track or signal appliances, adapted for insertion between the operating and operated elements of such lines, for introducing therein a certain variable amount of lost motion whereby the stroke movement of the operating element can be adjustably reduced to conform with the stroke limits of the switch point or other track device operated. The invention also involves provisions for the adjustment of the total effective length of the operating line, as will be more fully described below.

Simplification of the structure and facility of adjustment and cleansing are among the objects of the invention.

Figure 1:
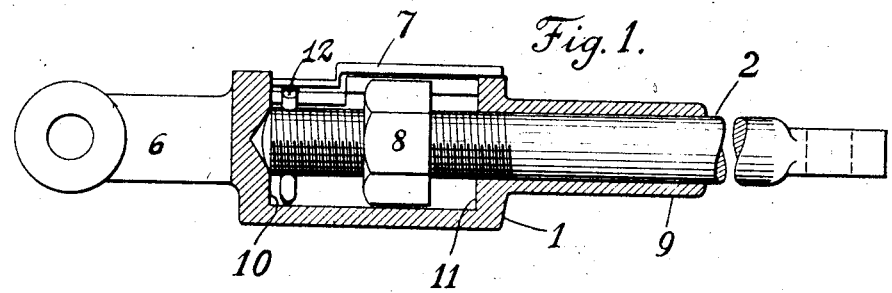
Figure 2:
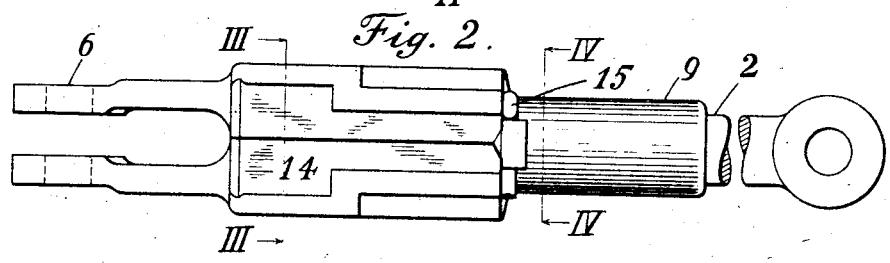
Figure 3:
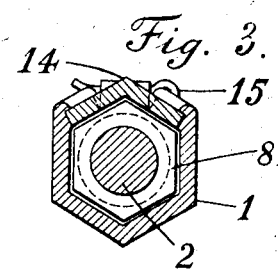
Figure 4:
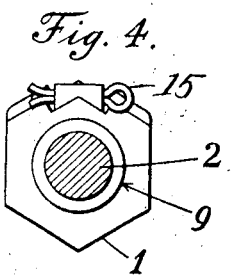
Figure 5:
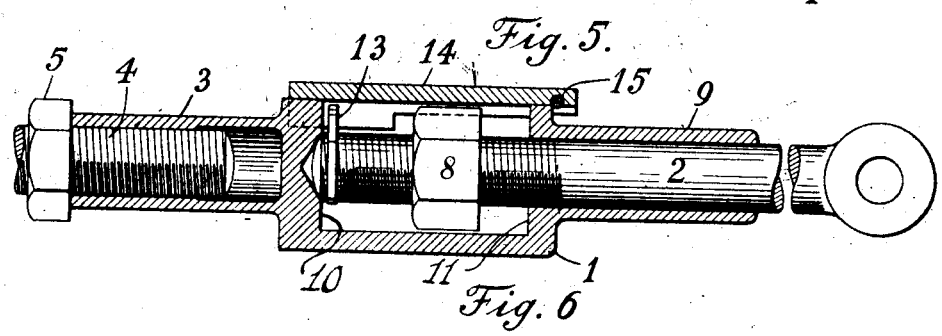
Figure 6:
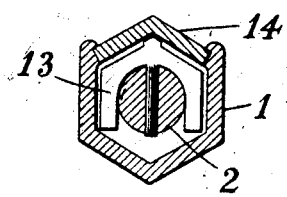

The drawings forming a part hereof illustrate a preferred form of the invention; Figure 1 being a central longitudinal sectional view, with certain parts in elevation and the cover removed; Fig. 2 a top plan view with the cover fastened in place; Fig. 3 a cross-section on line III—III of Fig. 2; Fig. 4 a similar cross-section on line IV—IV of Fig. 2; Fig. 5 is a longitudinal section of a modified form; and Fig. 6 is a cross-section thereof taken in the plane of the locking key.

The exemplification of the invention illustrated by the foregoing figures comprises a main frame or chambered casing 1 adapted for connection with one of the elements of the operating line, and a rod or shaft 2 mounted to move longitudinally and rotatably on the said casing and adapted to be connected to the other element of the operating line. Either or both of the two parts may be connected to its appropriate operating line element by means which will permit adjustment lengthwise of the device so as to enable the total effective length of the line to be varied in accordance with requirements; for instance, in Fig. 5 the main casing 1 is provided with an extended portion or boss 3 interiorly threaded and receiving the threaded end of a pipe line element or rod 4, which latter can be screwed inwardly or outwardly as desired and thereafter set fast with a lock nut 5. In Figs. 1 and 2 the provisions for this adjustment are omitted and the casing 1 is provided with connection jaws 6 for attachment to the pipe line element or the operating or operated device as desired, in the usual way. The chamber of the casing 1 is provided with a lateral opening in the form of a longitudinal slot, indicated at 7 in Fig. 1, which slot is substantially coextensive with the length of the chamber, and through it the latter may be readily scraped and cleaned of accumulations of grease or other matters. The slot terminates at one end in an enlargement, through which a nut 8 can be introduced edgewise into the chamber. The nut shown is an ordinary hexagonal nut and the cross-sectional shape of the chamber corresponds more or less to the shape of the nut, as indicated in Fig. 3, so that the latter is held from turning therein but is free to move lengthwise of the chamber. The rod 2 enters the chamber of the casing through the end opposite the attachment means 3 or 6, and preferably through a tubular boss or extension 9 formed integrally on the casing. Its inner end is threaded into and through the nut 8 so that it can abut endwise against the end wall 10 of the chamber when the rod is thrust from the right to the left in the drawings, while the nut 8 is adapted to abut against the opposite end wall 11 when the parts are moved relatively in the opposite direction. The position of the nut on the threaded end of the rod will manifestly control the extent of lost motion between the two parts, and such lost motion can therefore be set or adjusted as required by rotating the rod within the nut and casing. To prevent such relative rotation except when necessary for the purpose of adjustment or to hold the device as a whole from turning on the pipe line rod, such as the rod 4, the invention contemplates and includes a removable locking member which will key the rod to the casing without interfering with its longitudinal movement. Such a member may consist of a simple linch-pin, shown at 12 in Fig. 1. This pin is inserted in a transverse hole bored in the end of the rod 2 and serves to confine the nut on the rod as well as to confine the rod against rotation. The trifurcated key 13, however, which is shown in Figs. 5 and 6, is preferred for the purpose, since it fits the chamber somewhat more snugly and holds the rod with greater security. In both cases the key 12 or 13 is removable through the lateral nut opening in the side wall of the chamber, and in the form of Figs. 5 and 6 the cover 14 to such opening is relied upon to retain the key in place (see Fig. 6). The cover 14 conforms in shape to the cleaning slot and nut aperture, sliding in grooves as indicated and locked in its closed position by a linch pin 15.

The parts above described are assembled by inserting the nut in the chamber and passing the rod through the tubular boss 9 and screwing it into the nut. The key 12 or 13 is then inserted in the end of the rod and the cover put in place and fastened. The parts are thus longitudinally movable, though held against relative rotation, and any adjustment given to them will be permanent until intentionally changed. This can be done by removing the key and rotating the rod 2 within the nut, or by the reverse operation of rotating the casing and nut upon the rod, according as to which end of the connection device may be most conveniently detached from the operating line for this purpose. Other ways of adjusting the nut on the end of the rod may be provided for, but in any case the use of the key will accomplish the permanent setting of the adjustment.

While the device above described is shown as providing a complete inclosure to the end of the rod 2 and the nut 8 thereon, it will be understood that the same is merely for the purpose of protecting the moving parts in the casing from obstruction by dirt or water and that the device can be used without the cover, if desired, or with more than a single cleaning slot. As stated, however, it is preferred to make the inclosure as complete and perfect as possible, for which purpose the tubular extension 9 is made as long as practically convenient to form a substitute, so far as possible, for a gland or stuffing-box at this point for keeping out dust or other foreign matter.

I do not claim herein a connection adjustment comprising a frame or casing having provisions for attachment to one of the elements of the operating line, a nut non-rotatably held by said casing and having limited longitudinal movement with respect thereto, and a longitudinally movable rod threaded to said nut and provided with means for attachment to the other of said elements, inasmuch as this matter forms the subject of another application filed by me December 16th, 1908, Serial Number 467,908.

I claim:

1. A connection device of the kind described comprising a frame or casing adapted for connection to one of the elements of the operating line, a rod longitudinally and rotatably movable with respect to said casing and adapted for connection with the other of said elements, and a nut threaded on said rod and non-rotatably held by said casing, in combination with a locking member engaging said rod to hold the same against rotation in the casing.

2. A connection device of the kind described comprising a casing, a nut non-rotatably held by said casing and having limited longitudinal movement with respect thereto, a rod threaded in said nut, a member locking said rod and casing against relative rotation and a cover device confining such member in its locking position.

3. A connection device of the kind described comprising a hollow frame or casing inclosing and non-rotatably holding a longitudinally movable nut, a rod threaded in said nut and a key on said rod locking the same against rotation with respect to said nut.

4. A connection device of the kind described comprising a frame or casing, a nut having limited longitudinal movement with respect thereto, a rod threaded in said nut and a nut-confining key on the end of said rod non-rotatably engaging the casing.

5. In a device of the kind described, a hollow casing provided with opposing abutments, a rod co-acting endwise with one of said abutments, a nut on said rod co-acting with the other abutment and nut-confining means on said rod having non-rotative engagement with said casing.

6. A connection device of the kind described having a nut-confining chamber and provided with a lateral aperture nearer one end thereof than the other for the insertion of the nut therein, a nut non-rotatably held by said chamber and having limited longitudinal movement therein, a longitudinally movable rod threaded in the nut in said chamber and nut-confining means located on the end of said rod adjacent said aperture.

7. An adjustable connection device of the kind described comprising a hollow casing forming a nut-confining chamber with an aperture therein and a sliding cover for said aperture, combined with a nut non-rotatably held by said chamber and a rod threaded in said nut.

8. An adjustable connection device of the kind described comprising a casing formed with a nut-confining chamber and having a tubular boss adapted for adjustable attachment to one of the elements of the operating line, in combination with a rod adapted for attachment to the other element, a nut on said rod non-rotatably held in said casing and means in the casing for locking said rod and casing against relative rotation.

9. An adjustable connection device of the kind described comprising a casing formed with a chamber and having an extension at either end thereof, a rod sliding longitudinally within one of said extensions and bearing a device within said chamber for limiting its said sliding movement, the other of said extensions being provided with means for adjustable connection with an element of the operating line.

10. The combination with the chambered casing having a projecting extension on one end thereof provided with screw threads, and a tubular extension on the other end, of a rod sliding within said tubular extension, a device adjustably carried by said rod within the casing to limit the sliding movement therein, and means to prevent rotation of said rod relative to said casing.

11. The combination with the chambered casing having a screw-threaded end portion for attachment to an operating or operated line element, of a rod sliding in said casing, a device adjustable on said rod to limit its sliding movement therein, and a removable member confined in said casing and preventing rotation of the latter with respect to said line element.

12. A connection device of the kind described comprising a casing having a nut chamber and a lateral opening to said chamber substantially co-extensive with the length thereof and a cover for said opening, in combination with a rod and a nut thereon having limited longitudinal movement within said chamber.

13. In an adjustable connection device, a casing having a chamber with a longitudinal slot in the wall thereof terminating in an enlargement suitable for receiving a nut, in combination with a rod sliding within said casing and a nut in said casing and on the rod adapted to limit the sliding movement of the latter therein.

In testimony whereof, I have signed this specification in the presence of two witnesses.

STANLEY W. HAYES.

Witnesses:
  H. F. NESTER,
  K. M. THOMPSON.